Figure 1:
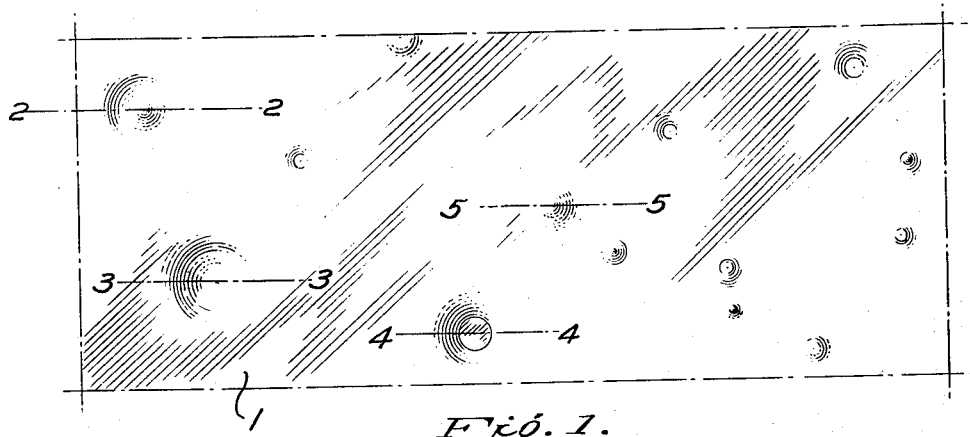

Aug. 18, 1953  F. R. SPENCER  2,649,423
SHORT OIL MODIFIED ALKYD RESIN SURFACE COATING MATERIALS
COMPRISING A POLYMER OF ALIPHATIC ESTERS OF
ALPHA,BETA UNSATURATED CARBOXYLIC ACIDS
Filed Jan. 21, 1950

INVENTOR
FRANK R. SPENCER,
BY James T. Dunn
ATTORNEY

Patented Aug. 18, 1953

2,649,423

UNITED STATES PATENT OFFICE 2,649,423

SHORT OIL MODIFIED ALKYD RESIN SURFACE COATING MATERIALS COMPRISING A POLYMER OF ALIPHATIC ESTERS OF ALPHA,BETA UNSATURATED CARBOXYLIC ACIDS

Frank R. Spencer, Stamford, Conn., assignor to American Cyanamid Company, New York, N. Y., a corporation of Maine Application January 21, 1950, Serial No. 139,804

6 Claims. (Cl. 260—21)

This invention relates to compositions of matter comprising short oil modified alkyd resins and small amounts of a modifier comprising polymers of aliphatic esters of $\alpha,\beta$-unsaturated carboxylic acids. This invention further relates to oil-free alkyd resins which have been modified by the addition of a polymer of aliphatic esters of $\alpha,\beta$-unsaturated carboxylic acids. This invention further relates to compositions of matter comprising compatible blends of oil-free or short oil alkyd resins and alkylated melamine-aldehyde resins to which has been added small amounts of polymers of aliphatic esters of $\alpha,\beta$-unsaturated carboxylic acids. This invention further relates to coating compositions which yield, on baking, a non-crawling or non-cratering film comprising compatible blends of oil-free or short oil alkyd resins with or without melamine-aldehyde resins and a modifier comprising a polymer of aliphatic esters of $\alpha,\beta$-unsaturated carboxylic acids.

One of the objects of the instant invention is to produce a coating composition which upon baking in the usual manner yields a film which shows no indications of "crawling" or cratering, which is one of the disadvantages characteristic of otherwise unmodified oil-free or short oil alkyd resin coating compositions. A further object of the instant invention is to maintain the alkali resistance of coating compositions by incorporating into oil-free or short oil alkyd resins any of the polymers mentioned above, while still avoiding the defect of crawling. These and other objects which are to be set forth hereinbelow will become apparent as the description of the invention unfolds.

In the preparation of coating compositions which are to be utilized primarily as baked enamels, it is desirable to produce oil-free or short oil alkyd resins because of their improved alkali resistance characteristics. It is a well known fact in the art that the avoidance of crawling or cratering, as it is sometimes called, can be accomplished by increasing the amount of oil which is used to modify the alkyd resin. There are, however, certain disadvantages which become more pronounced as the amount of oil in the modified alkyd resin is increased, for instance, the resistance to alkali diminishes as the amount of oil increases. Furthermore, the color stability or color retention diminishes as the amount of oil modifying the alkyd resin increases. A further disadvantage associated with the medium and long oil modified alkyds is the diminished heat resistance of such coating compositions. Additionally, long oil modified alkyds have diminished hardness of surface. It can be seen from this that the oil-free alkyd resins or short oil alkyd resins enhance the characteristics of the surface coatings produced therefrom. The desirability for the use of oil-free or short oil alkyd resins then is very great. However, in view of the tendency for these oil-free or short oil alkyd resins to crawl or crater, the possibility of utilizing the desired minimum amounts of oils in the modified alkyd has been a virtual impossibility because of the ultimate results produced. This cratering or crawling defect in the otherwise untreated oil-free or short oil alkyds outweighs all of the advantages that would be derived from the use of such resins in coating compositions. The applicant has discovered that by incorporating small amounts, in the order of about 0.05 part to 5.0 parts, of a polymer of aliphatic esters of $\alpha,\beta$-unsaturated acids into the oil-free or short oil modified alkyd resin that this defect can be completely eliminated or very greatly reduced and, at the same time, once can eliminate the tendency of these resins and resin solutions to flow away from the substrata areas. Ordinarily, this flow occurs notwithstanding gravitational forces and leaves in the baked surface coating these craterlike depressions, which action is sometimes referred to as "crawling" or "cratering" or "pinholing."

Figure 2:
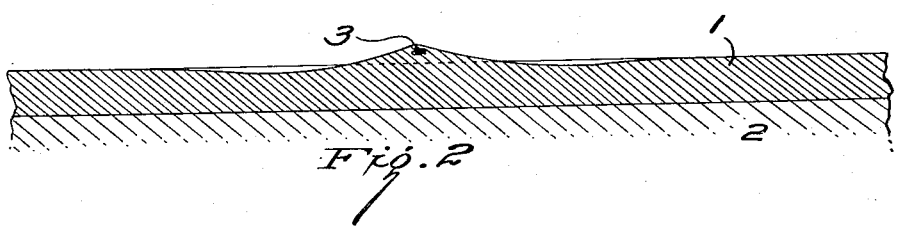
Figure 3:
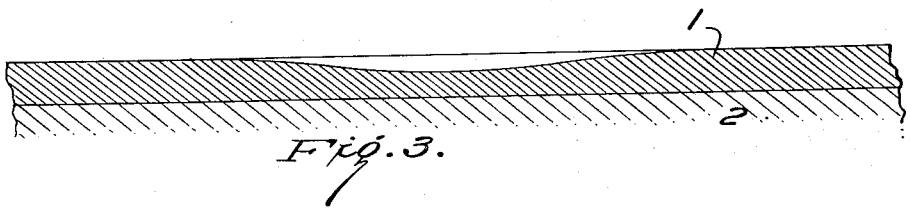
Figure 4:
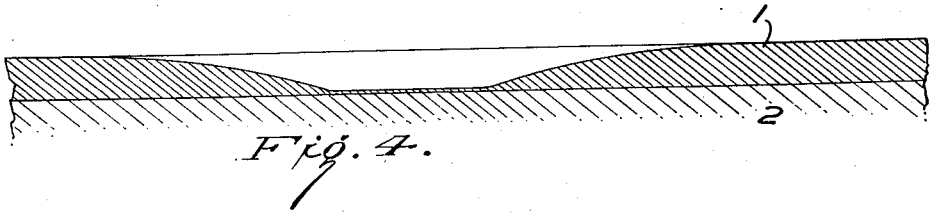
Figure 5:
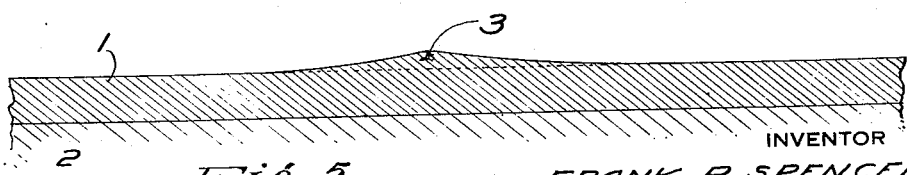

In the drawing, there are shown various types of cratering, crawling, and pin-holing defects, which are to be found when the oil-free or short-oil modified alkyd resin mixture is used as a surface coating material, without the use of the anti-cratering materials which I have found to be capable of eliminating these defects. Fig. 1 is a top plan view of a coated surface showing various crater-like defects. Fig. 2 is an enlarged scale cross sectional view of the line 2,2 of Fig. 1 showing a typical crater like depression due to the presence of a piece of lint, dust, or other foreign body on the surface of the substratum or in the film forming material at the time of the application of the surface coating material. Sometimes these foreign bodies attach themselves to the films after they have been applied and cause protuberances. Fig. 2 shows how the surface coating material can build up into a protuberance extending above the average plane surface of the coating material with depression below and each side of said protuberance. It will be readily seen that these depressions are emphasized when reflected light emitting from the curved surfaces of the depressions meets the eye. Fig. 3 shows an enlarged scale cross-sectional view of the line 3,3 of Fig. 1 showing a slight depression in the surface of the coating material. Reflected light emphasizes the size of a crater of this type and makes it an undesirable and very noticeable defect. Fig. 4 shows an enlarged scale cross sectional view of the line 4,4 of Fig. 1 showing an aggravated crater-like depression in the surface coating material wherein the lowermost part of the crater shows an extremely thin film of coating material superimposed on the substratum base. Again in this instance reflected light emphasizes the dimensions of the crater and detracts considerably from the appearance of the film generally. Fig. 5 shows an enlarged scale cross sectional view of the line 5,5 of Fig. 1 showing a protuberance caused by the presence of a piece of lint, dust, or other foreign body on the surface of the base material or in the surface coating material at the time of the application of the coating material. In contradistinction with Fig. 2, it will be noted that the type of defect shown in Fig. 5 causes a protuberance in the surface coating material but does not cause the depressions on each side of the protuberance as was the case in Fig. 2. In the Figs. 2, 3, 4 and 5, the reference numeral 1 represents the surface coating material; 2 represents the base to which the surface coating material is applied. In the Figs. 2 and 5, the No. 3 represents a foreign body such as a piece of lint, dust, or the like. These unsightly crater-like depressions, shown in Figs. 2, 3, and 4, can be completely eliminated or very substantially diminished by incorporating into the surface coating materials of the present invention small amounts of a polymeric aliphatic ester of an alpha, beta unsaturated carboxylic acid. The effect, for example, would be to change the defect from that shown in Fig. 2 to that shown in Fig. 5. The defect shown in Fig. 2 is not readily correctable by ordinary surface treating means such as by sanding or polishing or both. In contradistinction, however, the defect as shown in Fig. 5 is readily correctable by ordinary surface treating means.

In the preparation of these short-oil modified alkyd resins, it is preferred that the amount of oil present as a modifier in the alkyd be not more than 25% of oil based on the total weight of the modified alkyd resin, with a preferred embodiment within the range of 10% to 15% of oil. This defines the upper limits of what is meant by a short-oil modified alkyd resin in accordance with the discovery of the applicant. There is actually no lower limit as to the amount of oil which may be used in the preparation of these alkyd resins, as in certain instances it may be desired to use no oil to modify the alkyd whereby one would derive an oil free alkyd resin. Similarly, one may use oil modified alkyd resins containing 5%, 10%, 15%, 20% and 25% oil based on the total weight of the modified alkyd produced.

In the preparation of the short oil modified alkyd, it is generally preferred to use either semi-drying oils or non-drying oils or mixtures of these two general classes of oils. There is to be derived little overall advantage in using exclusively the unsaturated or drying oils although they may be used where, for example, color retention or baking is not as important as adhesion.

In the preparation of these alkyd resins, one may use saturated polycarboxylic acids or unsaturated polycarboxylic acids. It is generally preferred in practice, however, that the saturated polycarboxylic acids be used. Amongst those saturated polycarboxylic acids which may be used in the practice of the process of this invention are phthalic, terephthalic, oxalic, malonic, succinic, glutaric, sebacic, adipic, pimelic, suberic, azelaic, tricarballylic, citric, tartaric, and malic. Amongst the unsaturated polycarboxylic acids which may be used are maleic, fumaric, itaconic, and the like. In addition to the acid, it is conventional to use the esters of these acids or their anhydrides in the preparation of the alkyds. Obviously, in the preparation of these alkyd resins the polycarboxylic acids may be used either singly or in combination with one another.

In the preparation of oil free or short oil modified alkyd resins, the conventional polyhydric alcohols may be used such as ethylene glycol, diethylene glycol, trimethylene glycol, tetramethylene glycol, pentamethylene glycol, pinacol, trimethylol propane, trimethylol ethane, arabitol, adonitol, mannitol, dulcitol, sorbitol, glycerol, and pentaerythritol, and the like. These polyhydric alcohols and other comparable polyhydric alcohols may be used either singly or in combination with one another in the esterification reaction in preparation of the alkyd resin.

In the esterification reaction between the polycarboxylic acid and the polyhydric alcohol in the preparation of the oil free or short oil alkyd resins, it is preferred to use the proportions which are conventional in the art.

In the preparation of the short oil modified alkyd resins it has been set forth hereinabove that it is preferred to use either a non-drying oil or a semi-drying oil or the acids derived therefrom. Amongst those oils which may be utilized in the preparation of these short oil modified alkyd resins are castor oil, chaulmoogra oil, soya oil, coconut oil, cottonseed oil, cherry kernel oil, corn oil, grape seed oil, hazel nut oil, lard oil, olive oil, peach kernel oil, peanut oil, pistachio nut oil, rape seed oil, and the like. It has been set forth hereinabove that the use of the polymeric modifiers in modifying these resinous compositions are of particular use when the amount of oil used to modify the alkyd resin is in a quantity not exceeding 25% of the total weight of the alkyd resin. Although more oxidizable or unsaturated oils may be included, the preferred embodiment of the instant invention is in the preparation of short oil alkyd resins prepared by the use of semi-drying or non-drying oils in the proportions stated or, of course, in oil free resins.

In the preparation of the coating compositions, one may make use of the oil free or short oil alkyd resins as the sole resinous material or one may incorporate into the composition melamine-aldehyde resins or urea-aldehyde resins.

The melamine or urea may be reacted with any one or more aldehydes such as formaldehyde, acetaldehyde, benzaldehyde, crotonaldehyde, furfural and the like in aqueous or organic solvent. Preferably, one would use formaldehyde. A suitable mol ratio of melamine to aldehyde may be used from 1:1 to 1:6. One may use alkylated or non-alkylated melamine aldehyde resins but preferably alkylated. Optimum results being accomplished by use of butylated melamine formaldehyde resins in admixture with the alkyd resins previously described. When the urea-aldehyde resins are used, they may be prepared in the conventional manner and in mol ratios of urea to aldehyde of 1:1 to 1:4, respectively. The urea resins may also be alkylated or nonalkylated but preferably alkylated. For optimum results, the butylated urea resins are used.

In order that the present invention may be completely understood, the following examples are set forth. These examples are given by way of illustration only and are not to be interpreted as a limitation on the case notwithstanding the specific features of the invention which are set forth herein. All parts are parts by weight.

RESIN A 115 parts of glycerin, 185 parts of phthalic acid anhydride and 60 parts of cocoanut oil acids are introduced into a suitable reaction chamber and are heated gradually to about 380° F. in a three hour period and then gradually heated to 400° F. in about 1½ hour period. The batch is held at this temperature until an acid number of 40 or less is obtained, after which time the batch is cooled to about 275° to 300° F. The batch may then be diluted with a suitable solvent such as butyl acetate to a 50% solids solution.

RESIN B

|   | Parts |
|---|---|
| Melamine (1 mol) | 126 |
| Formalin (5 mols) (37% formaldehyde in water) | 405.5 |
| n-Butanol | 440 |

This mixture is placed in a reflux apparatus which is provided with a condenser and a suitable water trap through which the reflux condensate passes on its return to the reaction chamber and in which the essentially aqueous fraction of the condensate may be separated from the essentially non-aqueous fraction and means is provided so that the former fraction may be drawn off if desirable. The reaction mixture is refluxed at a temperature of about 91–93° C. at atmospheric pressure for 6–12 hours. The water is removed by azeotropic distillation from the reaction mixture during the reflux operation beginning preferably after about 2–5 hours have elapsed and the water so removed is separated from the reflux condensate in the water trap. During the distillation about 550 additional parts of butanol are added gradually. When the reflux condensate is substantially anhydrous the vapor temperature will be about 100–105° C. The pressure is lowered sufficiently to reduce the vapor temperature to about 85–90° C. and the resin solution is concentrated to about 60–70% solids by vacuum distillation. The resulting resin solution may be diluted to about 50% solids with any desired solvent or diluent, e. g., xylene.

The resin solution thus obtained is well suited for blending with a wide variety of oil free or short oil modified alkyd resins solutions or dispersions such as the one set forth hereinabove under example Resin A or in other examples in which the alkyd resin was prepared with no modifying oil or in oil modified alkyd resins containing 5%, 10%, 15%, 20%, 25% of the modifying oil, such percentages being based on the total weight of the alkyd resin produced.

RESIN C 148 parts by weight of phthalic acid anhydride, 100 parts of glycerin and 55 parts of soya bean fatty acids are introduced into a suitable reaction chamber and are heated to about 400° F. in a three hour period and held at this temperature until an acid number of between 30 and 50 is reached. A solvent, such as methyl Cellosolve, is then added in amount sufficient to produce a 50% solids solution, and the solution is then agitated at about 200° F. until it has become completely clear.

The preparation of the oil free alkyd resins is a matter well-known by those skilled in the art and illustration of such resin is not imperatively necessary. However, for the sake of completeness, the following examples are set forth for the purpose of illustration only.

RESIN D 148 parts of phthalic acid anhydride and 204 parts of pentaerythritol are introduced into a suitable reaction chamber equipped with thermometer, condenser and stirrer, and are heated gradually to a temperature of about 360° F. in about a three-hour period, the temperature is then gradually increased to about 390° F. and maintained at that temperature for about 1½ hours. As soon as an acid number below about 60–90 is reached the reaction mixture is cooled to about 250 to 300° F. The batch is then diluted with a suitable solvent such as methyl Cellosolve to a 50% solid solution and is then ready for use in the preparation of the coating composition.

Blends of the melamine-formaldehyde resin solutions such as those prepared according to example Resin B hereinabove with the oil modified alkyds of Resins A or C or the oil free alkyds of Resin D may be accomplished on a basis of 20 to 60 parts of melamine resins to about 80 to 40 parts of alkyd in the formulation of baking enamels. As an example of a baking enamel, the following composition is set forth.

ENAMEL I

|   | Parts |
|---|---|
| Resin A (50% solids solution) | 130 |
| Resin B (50% solids solution) | 70 |
| Pigment (toluidene Red) | 25 |
| Solvent | 60 |

The pigment is preferably ground into the resins solution in a roller or ball mill. To this composition is added about 1% of polybutyl acrylate and the entire mixture is completely stirred until a homogeneous compatible mixture is obtained. The coating composition is then applied to bare sheet steel or bonderized steel or over a priming coat. When baked for a period of ½ hour to 1 hour at temperatures between about 225° F. to 350° F. a smooth hard glossy film develops which displays no cratering or crawling, whereas without the polybutyl acrylate evidence of considerable cratering is to be noted.

A baking enamel may also be produced by utilizing the oil-free or short oil-modified alkyd as the sole resinous material to which has been added one of the polymers of an aliphatic ester of alpha,beta-unsaturated carboxylic acids. Such a composition can be prepared according to the following formulation:

ENAMEL II

|   | Parts |
|---|---|
| Resin A (50% solids solution) | 150 |
| Pigment (titanium dioxide) | 68.5 |
| Solvent thinner two-thirds xylol one-third butanol | 75 |
| Polybutyl fumarate | 1.5 |

The individual components are thoroughly mixed until a homogeneous composition is obtained. This coating composition can be then applied to such surfaces as bare sheet steel, or steel to which a primary coating has been applied and baked at about 425 to 475° F. for a period of about ½ to 1 hour. This coating film is glossy, hard, alkali-resistant and shows no indication whatever of crater-like defects, whereas without the polybutyl fumarate evidence of considerable cratering is to be noted.

The following coating composition may be prepared which is utilizable as a baking enamel.

ENAMEL III 150 parts of Resin D (50% solid solution) 30 parts of pigment, and 75 parts of thinner and 1.5 parts of polybutyl acrylate are thoroughly mixed until a compatible homogeneous composition is derived. This composition is then applied to bare sheet steel and baked at temperature from 425–475° F. for a period of about 30–60 minutes to 2 hours. The film produced is hard, glossy, scratch resistant and displays no evidence whatever of crawling.

It is to be noted that, in the use of the oil free or short oil alkyd resins alone, it is necessary to bake the coating composition for a somewhat longer period of time or at higher temperatures than the oil-free or the short-oil alkyd modified with the melamine-formaldehyde composition set forth hereinabove. It is to be noted further, however, that the results obtained in each individual instance are similarly excellent when the polymeric modifier has been added.

As modifiers for the oil-free or short oil alkyd resins in the preparation of these coating resins it is possible to add in addition to the melamine-aldehyde compositions other resinous materials such as urea-aldehyde condensation products having varying ratios from 1:1 to 1:4. In the preparation of the amino resins to be added to the oil free or the short oil modified alkyd resins, it is generally preferred that these aminoplast resins be alkylated with aliphatic alcohols having at least 4 and not more than 12 carbon atoms. It is preferred for optimum results to use the butylated melamine-formaldehyde resins or the butylated urea-aldehyde resins when the aminoplast resins and alkyds are used in combination with one another. The reason for this is to maintain the most desirable hydrocarbon tolerance of the resinous mixture in solvents.

In the preparation of these coating compositions, it is conventional to use an organic solvent for the resin whether the resin be alkyd alone or a blend of the oil-free or short oil resins with the aminoplast resins. Among the solvents which may be used are acetone, butyl acetate, butyl carbitol, butyl ether of ethylene glycol, butanol, cyclohexanone, dichlor-ethylene, diisobutyl ketone, dioxane, ethylene glycol, ethyl lactate, ethyl acrylate, ethyl acetate, isophorone, methyl ethyl ketone, methyl-isobutyl ketone, styrene, tetrachlorethylene, xylene, and the like. The amount of solvent which may be used can be varied considerably from no solvent up to about 200% solvent based on the total weight of the resin.

As pigments, one may use a great variety of pigments depending on the particular coloration desired and in the use and preparation thereof, one may utilize pigments in amounts varying from no pigment for clear coating compositions up to 200% by weight of pigment based on the total weight of the resin as an approximate maximum. Amongst pigments that may be used are zinc oxide, titanium dioxide, zinc sulfide, antimony oxide, Prussian blue, carbon black, chrome yellow, chrome orange and the like. In addition, many of the various so-called inert pigments may be added for their special effect.

Amongst the materials to which these coating compositions may be applied are such substrata metals as aluminum, zinc, tin, iron, bonderized steel, copper, nickel, chromium, lead and chromatized Dow metal. They are additionally applicable to wood, glass, and the like.

The polybutyl acrylate used in the composition of the instant invention may be readily prepared according to the following process.

Modifier A

About 160 parts of a suitable solvent such as benzene are introduced into a suitable reaction chamber and are heated until a temperature of about 80 to 100° C. is reached. A mixture of about 0.05% of benzoyl peroxide admixed into about 240 parts of the monomeric ester, butyl acrylate, is then introduced into the heated solvent dropwise and the mixture is continuously heated under slight reflux. After the monomer has been completely added to the solvent, the reaction mixture is heated under reflux for about a 2-hour period until the temperature becomes comparatively steady. Solids determinations may be made at regular intervals and when the total solids content is within the range of 50% to 70% the heating can be discontinued. This polymer may be then further diluted to low concentrations such as concentrations of 10 to 20% solids or less as desired by the addition of more solvent. The polybutyl acrylate solution thus prepared is ready for use in the composition of the instant invention.

Modifier B

In order to prepare the polybutyl fumarate, a method of preparation comparable to that used for the polybutyl acrylate can be followed. The monomeric butyl fumarate is introduced into a suitable reaction chamber with a small amount of benzoyl peroxide and is heated until a temperature of 80° to 100° C. is reached. Heating is continued at that temperature range until the viscosity becomes substantially constant. This heating will require from six to ten hours. It is not necessary, however, in the preparation of the polybutyl fumarate to utilize a solvent although if one desires to do so it is possible to accomplish this fact. Instead of the benzoyl-peroxide catalyst, it is possible to substitute a great variety of other catalysts which are well-known to those skilled in the art. As an example of a different variety, one may utilize ditertiary butyl peroxide which is a high temperature catalyst and in the use of such a catalyst, it would be necessary to heat the fumarate at 130 to 160° C., until the viscosity became constant and this would require a time interval of between 6 and 10 hours.

The modifiers which may be used in the practice of the process of this invention to prevent the occurrence of cratering in coating compositions comprising oil-free or short oil modified alkyd resins or mixtures of same with aminoplastic resins are the polymers of the aliphatic esters of alpha, beta-unsaturated carboxylic acids. The aliphatic alcohols which may be utilized in the preparation of the esters are those which contain between 2 and 18 carbon atoms such as ethyl, propyl, butyl, isobutyl, amyl, hexyl alcohols, octadecyl, lauryl, and the like. The alpha, beta unsaturated carboxylic acids which may be used in the preparation of the esters may be either monocarboxylic acids or polycarboxylic acids, but it is necessary that the unsaturation in these acids be between the alpha, beta carbon atoms. To prepare the esters, one may use such acids as acrylic, crotonic, isocrotonic, methyl acrylic, fumaric, maleic, glutaconic, citraconic, itaconic, and the like. The method of preparing the polymers of these esters has been set forth hereinabove with respect to the polybutyl acrylate and polybutyl fumarate and the preparation of the other polymers may be accomplished by a comparable procedure. One may use any polymer up to and including those whose polymerization has been permitted to continue until they reach a stage just short of complete incompatibility with the resinous mixture dissolved in solvent. Any slight incompatability between the higher molecular weight polymer of the aliphatic esters of the alpha, beta unsaturated carboxylic acid and the resinous solution is of no appreciable consequence and these high molecular weight polymers may be utilized throughout the range of increasing incompatibility and up to that point wherein complete incompatibility is reached between the polymers of the alpha, beta acid esters and the resinous solutions. Mixtures of the polymers with each other and with their monomers may be utilized.

Although the ethyl, propyl, amyl, and higher alkyl esters produce a decided improvement in inhibiting cratering in these resinous coating compositions, the butyl esters actually produce optimum results particularly the polybutyl esters of acrylic and fumaric acids. These latter two, polybutyl acrylate and polybutyl fumarate, have produced optimum results in the elimination of cratering in these enamel coating compositions. The amount of these polymers of the lower alkyl esters of alpha, beta unsaturated carboxylic acids which may be used to modify the oil-free or short oil alkyd resins may be varied over a fairly wide range such as 0.01% to 10% by weight of the polymer based on the total weight of the resin solids. When using the lower molecular weight polymers, it is desirable to use 5%–10% of the polymer, whereas in the use of the high molecular weight polymers, it is possible to use very small amounts such as 0.01%–1.0% in order to avoid the tendency of the enamels to crater. It is actually preferred that one use between 0.1% and 5% of the polymers with 0.5% of a fairly high molecular weight polymer producing optimum results. In the use of the polybutyl acrylate as a modifier, 0.5% of the polymer having a molecular weight of 3000 to 7500 produces excellent results.

I claim:

1. A coating composition, capable of yielding on baking a non-cratering film, comprising a compatible blend of an alkyd resin modified with up to 25% of a material selected from the group consisting of semi-drying and non-drying glyceride oils and their acids, a butylated melamine-formaldehyde resin, and from 0.05% to 10% by weight of a polymeric alkyl ester of an alpha, beta unsaturated carboxylic acid, wherein said percentage by weight is based on the total weight of the resin solids.

2. A coating composition, capable of yielding on baking a non-cratering film, comprising a compatible blend of an alkyd resin modified with up to 25% of a material selected from the group consisting of semi-drying and non-drying glyceride oils and their acids, a butylated melamine-formaldehyde resin and from 0.1–5% by weight of a polymeric alkyl ester of an alpha, beta unsaturated carboxylic acid wherein said percentage by weight is based on the total weight of the resin solids.

3. A coating composition, capable of yielding on baking a non-cratering film comprising a compatible blend of an alkyd resin modified with up to 25% of a material selected from the group consisting of semi-drying and non-drying glyceride oils and their acids, and from 0.05% to 10% by weight of polybutyl fumarate.

4. A coating composition, capable of yielding on baking a non-cratering film, comprising a compatible blend of an alkyd resin modified with up to 25% of a material selected from the group consisting of semi-drying and non-drying glyceride oils and their acids, a butylated melamine-formaldehyde resin and 0.05% to 10% by weight of polybutyl fumarate, wherein said percentages by weight are based on the total weight of the resin solids.

5. A coating composition, capable of yielding on baking a non-cratering film, comprising a compatible blend of an alkyd resin modified with up to 25% of a material selected from the group consisting of semi-drying and non-drying glyceride oils and their acids, a butylated melamine-formaldehyde resin and 0.05% to 10% by weight of polybutyl acrylate, wherein said percentages by weight are based on the total weight of the resin solids.

6. A coating composition, capable of yielding on baking, a non-cratering film comprising a compatible blend of an alkyd resin modified with up to 25% by weight of a material selected from the group consisting of semi-drying and non-drying oils and their acids, an aminoplast resin selected from the group consisting of melamine-formaldehyde resins and urea-formaldehyde resins, and from 0.05% to 10% by weight of a polymeric alkyl ester of an alpha, beta unsaturated carboxylic acid, wherein said percentages by weight are based on the total weight of the resin solids.

FRANK R. SPENCER.

References Cited in the file of this patent

UNITED STATES PATENTS

| Number | Name | Date |
|---|---|---|
| 2,069,983 | Ubben | Feb. 9, 1937 |
| 2,218,474 | Moore | Oct. 15, 1940 |
| 2,246,095 | Graves | June 17, 1941 |
| 2,294,590 | West | Sept. 1, 1942 |
| 2,295,699 | Thackston | Sept. 15, 1942 |
| 2,378,365 | Swain | June 12, 1945 |
| 2,464,568 | Flynn et al. | Mar. 15, 1949 |
| 2,498,621 | Kropa et al. | Feb. 21, 1950 |

FOREIGN PATENTS

| Number | Country | Date |
|---|---|---|
| 555,148 | Great Britain | Aug. 6, 1943 |